United States Patent
Xie et al.

(10) Patent No.: US 8,724,809 B2
(45) Date of Patent: May 13, 2014

(54) METHOD AND SYSTEM FOR TUNING TO ENCRYPTED DIGITAL TELEVISION CHANNELS

(75) Inventors: Fei Xie, Irvine, CA (US); Victor Liang, Irvine, CA (US); Kitae Nahm, Kirkland, WA (US); Juan Carlos Trujillo, San Diego, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1336 days.

(21) Appl. No.: 12/190,503

(22) Filed: Aug. 12, 2008

(65) Prior Publication Data

US 2010/0040229 A1 Feb. 18, 2010

(51) Int. Cl.
*H04N 7/167* (2011.01)

(52) U.S. Cl.
USPC ............... 380/210; 380/200; 380/232; 726/2; 726/4; 726/5; 726/6

(58) Field of Classification Search
USPC .................. 380/200, 210, 232; 726/2, 4–6
See application file for complete search history.

(56) References Cited

U.S. PATENT DOCUMENTS

| | | | |
|---|---|---|---|
| 5,594,492 A | 1/1997 | O'Callaghan et al. | |
| 6,016,172 A | 1/2000 | Huh | |
| 6,078,594 A | 6/2000 | Anderson et al. | |
| 7,239,704 B1 * | 7/2007 | Maillard et al. | 380/210 |
| 2002/0116457 A1 * | 8/2002 | Eshleman et al. | 709/203 |
| 2005/0144646 A1 * | 6/2005 | Lecrom et al. | 725/100 |
| 2005/0198442 A1 * | 9/2005 | Mandler | 711/145 |
| 2007/0234395 A1 * | 10/2007 | Dureau et al. | 725/135 |
| 2009/0046855 A1 * | 2/2009 | Grimes et al. | 380/200 |

* cited by examiner

*Primary Examiner* — Andrew Nalven
*Assistant Examiner* — Joseph Pan
(74) *Attorney, Agent, or Firm* — Kenneth L. Sherman, Esq.; Michael Zarrabian, Esq.; Sherman & Zarrabian LLP

(57) ABSTRACT

A method and system for tuning to a scrambled television channel is provided. One implementation involves receiving a channel selection from a user, tuning to the selected scrambled channel, checking a cache for Conditional Access (CA) descrambling information associated with the selected channel, and in case of a cache hit, then retrieving the descrambling information associated with the selected channel from the cache for descrambling the scrambled channel.

19 Claims, 2 Drawing Sheets

METHOD AND SYSTEM FOR TUNING TO ENCRYPTED DIGITAL TELEVISION CHANNELS

FIELD OF THE INVENTION

The present invention relates to tuning to digital channels, and in particular to tuning to encrypted digital channels.

BACKGROUND OF THE INVENTION

A typical modern digital television broadcasting network utilizes a Conditional Access (CA) system using MPEG2 as transporting technology. In such a system, most content is CA encrypted and only available to certain subscribers, providing a CA-enabled MPEG2 (CAMPEG2) system. Changing to a CA enabled channel requires a complex procedure to retrieve the particular CA information for that channel and to forward to a CA control module. Compared with Analog Broadcasting systems, channel change in CAMPEG2 systems is plagued by significant delay due to the time required to retrieve and parse CA information.

BRIEF SUMMARY OF THE INVENTION

The present invention provides a method and system for tuning to a scrambled television channel. One embodiment provides a tuning process involving receiving a channel selection from a user, tuning to the selected scrambled channel, checking a cache for Conditional Access (CA) information including descrambling information associated with the selected channel, and in case of a cache hit, then retrieving the CA information associated with the selected channel from the cache for descrambling the scrambled channel.

The tuning process may further involve, in case of a cache miss, retrieving CA information associated with the selected channel from a distribution network. The tuning process may further involve, in case of a cache miss, storing the retrieved CA information associated with the selected channel in the cache.

The tuning process may further involve, in case of a cache miss, simultaneously retrieving CA information associated with the selected channel from a distribution network (while looking up in cache). The tuning process may further involve, in case of a cache miss, storing the retrieved CA information associated with the selected channel in the cache.

The tuning process may further involve, in case of a cache hit, also retrieving CA information associated with the selected channel from a distribution network, and overriding the cached CA information associated with the selected channel if different from the CA information retrieved from the distribution channel.

The tuning process may further involve, in case of a cache hit, retrieving the CA information associated with the selected channel from the cache for descrambling the scrambled channel, and substantially simultaneously also retrieving CA information associated with the selected channel from a distribution network, and overriding the cached CA information associated with the selected channel if different from the CA information retrieved from the distribution channel.

These and other features, aspects and advantages of the present invention will become understood with reference to the following description, appended claims and accompanying figures.

DETAILED DESCRIPTION OF THE INVENTION

This invention provides a method and system for tuning to encrypted (scrambled) digital television channels. One embodiment involves tuning to encrypted digital television channels by reducing the time required for retrieving decryption information for decrypting the channel content. In case of a conditional channel (CA) scrambled channel, this involves retrieving CA information (descrambling key/information) with reduced delay, for descrambling the channel content, which allows a user to change channels on a CAMPEG2 tuner with reduced delay.

Due to the nature of CAMPEG2 systems, CA information typically remains the same for extended periods of time. Further, a typical user has a relatively small favorite channel pool, wherein the user hops among these favorite channels again and again.

According to an embodiment of the invention, the CA information for each channel is retrieved, parsed and stored during a first tuning (visit) to the channel. Thereafter, the stored CA information is utilized during each subsequent tuning to that channel. As such, there is no need to involve complex and time consuming CA retrieval and parsing processing each time the channel is tuned to. This reduces channel changing delay on CA encrypted channels in digital television application.

A tuning system according to an embodiment of the invention implements parallel processing of the CA encrypted channel information for accuracy, wherein at the worst case, the channel change delay time is no more than that in conventional approaches. The tuning system provides tuning to CA encrypted channels in digital broadcasting systems without relying on user behavior prediction or additional tuners.

Rather, the tuning system caches historical user selected channel information and reuses that information for subsequent channel tuning. If the cache limit is reached, CA information of certain channels can be swapped out of the cache. As such, user interactive experience with a television using said tuning system for tuning to encrypted digital television channels is superior in relation to conventional approaches.

Figure 1:
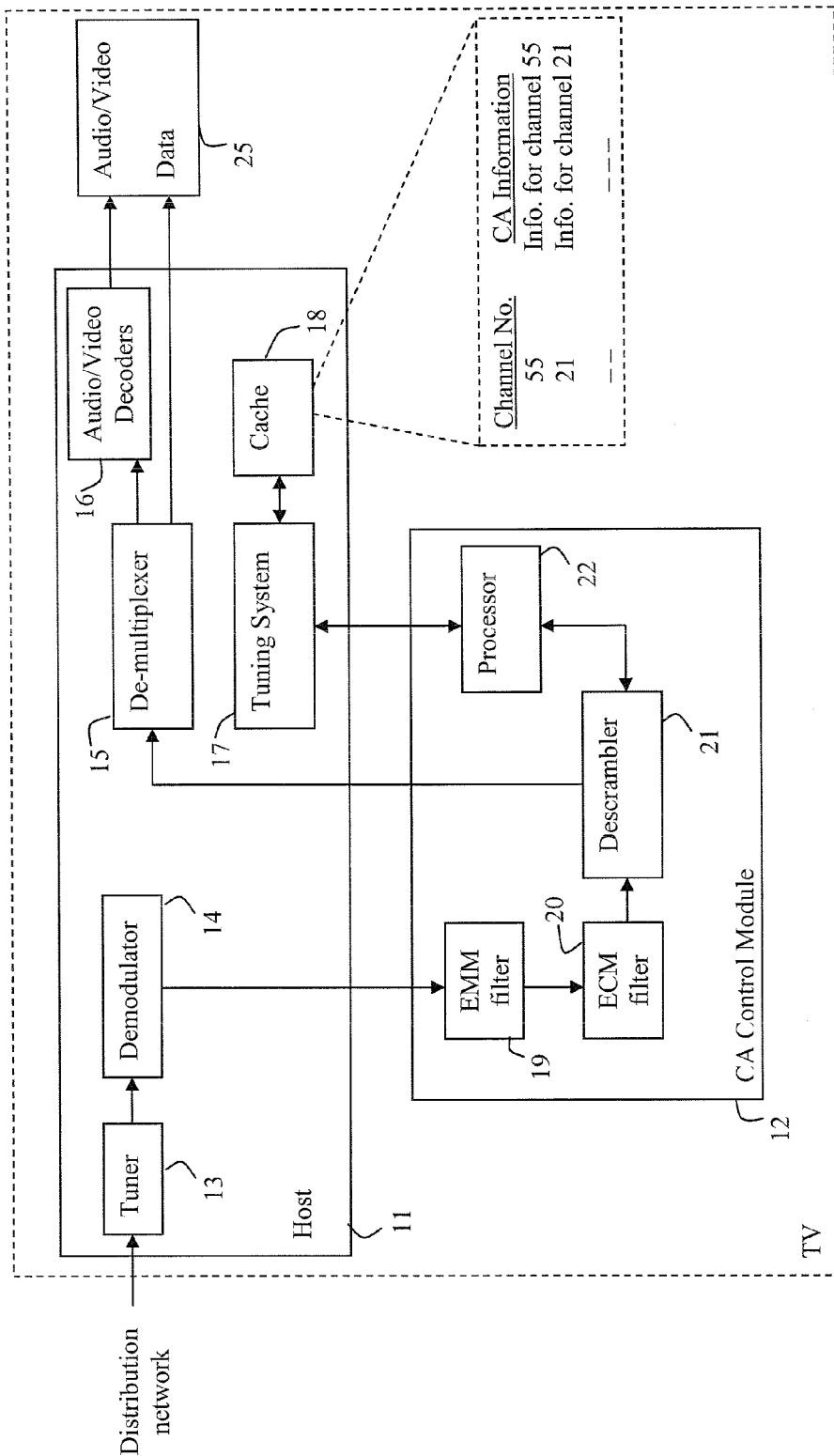
FIG. 1 shows a functional block diagram of a system implementing a method of tuning encrypted digital television channels, according to an embodiment of the invention.

An example implementation of the invention is now described. FIG. 1 shows an example Conditional Access cable receiving apparatus 10 that may be implemented in a television, according to an embodiment of the invention. User subscription status is carried by Entitlement Management Message (EMM) and Entitlement Control Message (ECM) information from a distribution network (e.g., cable head end).

The user receiving apparatus 10 (e.g., set-top box, smart card, television, etc.) includes a host module 11 and a CA control module 12. The host 11 receives CAMPEG2 from a distribution network for processing. The host module 11 includes a tuner 13, a demodulator 14, a de-multiplexer 15, audio/video decoders 16, a tuning system 17 and a cache 18. The tuner 13 tunes to a channel selected by a user. The audio/video decoders 16 decode encoded audio/video information for presentation to a user on a presentation device 25 (e.g., display screen and speakers).

The CA control module 12 includes an EMM filter 19, an ECM filter 20, a descrambler 21 and a processor 22. The CA control module may implement a National Renewable Security System (NRSS), known in the art.

When a user selects a CA scrambled channel, the host 11 retrieves CA information from the distribution network for the selected channel and passes it to the CA control module 12 to find the correct ECM. Both the EMM and ECM information are processed in the CA control module 12 to descramble the encrypted content.

When a user first selects a CA scrambled channel, retrieving CA information includes six major steps:
1. User selects a channel.
2. Tuning & Pre-processing.
3. Retrieve program association table (PAT) and parse it.
4. Retrieve program map table (PMT).
5. Parse PMT and retrieve CA information.
6. Send CA information to CA control module 12 for descrambling the CA scrambled content for display on a TV screen.

Steps 3 and 4 filter the incoming bit stream, which can be time consuming. Based on the network condition, steps 3 and 4 may require as much as 400 milliseconds for each and every channel change.

According to an example implementation of the invention, at least steps 3 and 4 are skipped for most channel changes without loss of accuracy. This is achieved by the tuning system 17 caching CA information in the cache 18 (e.g., memory) when a CA scrambled channel is first tuned to. The next time the user tunes to that same channel, the tuning system 17 retrieves and uses the cached CA information to descramble the CA content, instead of filtering on the incoming bit stream again to obtain that CA information. This eliminates the most significant source of delay in processing a CA scrambled channel.

Figure 2:
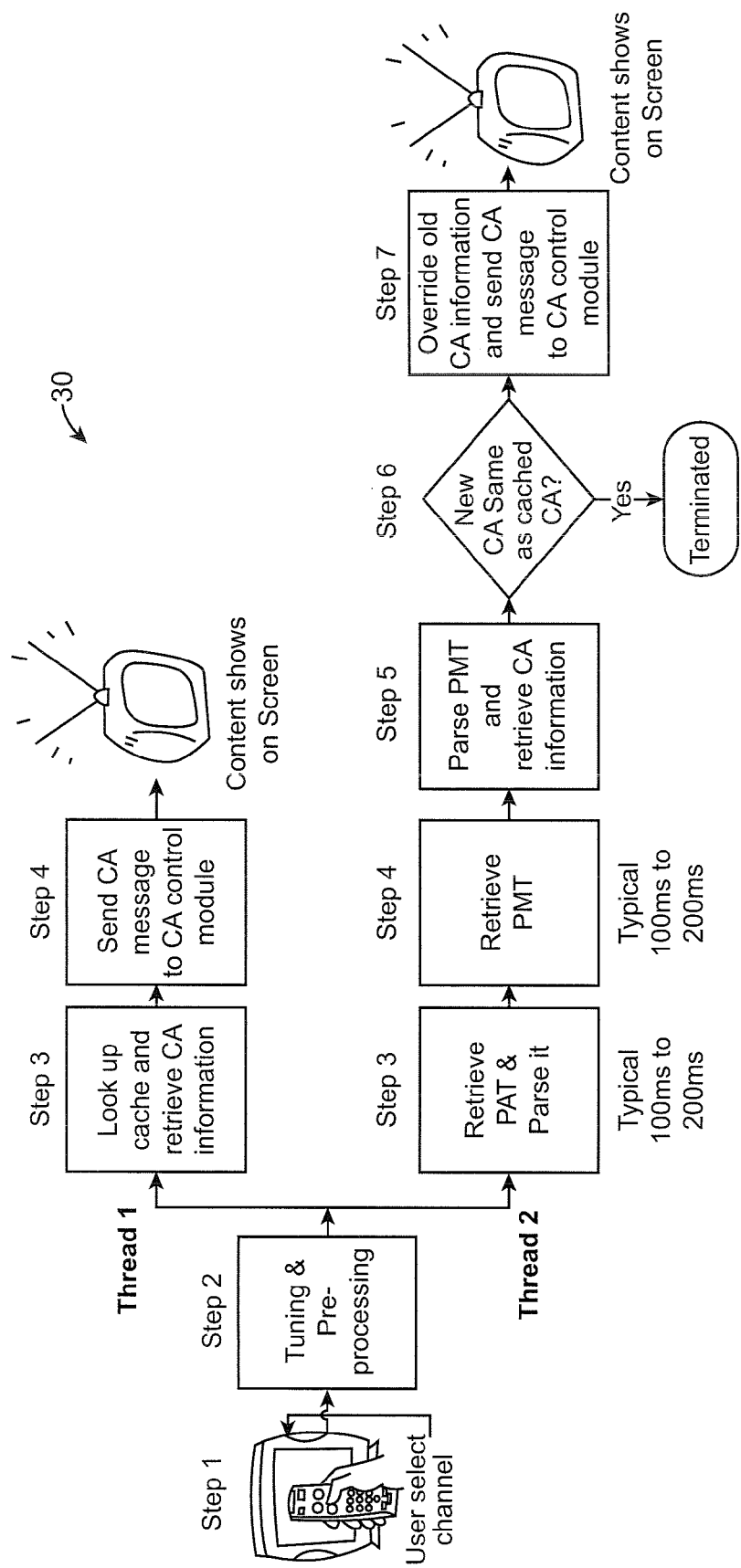
FIG. 2 shows a process for tuning encrypted digital television channels, according to an embodiment of the invention.

In one implementation, the tuning system 17 utilizes parallel processing for accuracy and worst case channel change time guarantee. For example, if the CA information for a CA scrambled channel changes, then the cached CA information for that channel cannot be used to descramble the channel content correctly. To resolve this issue, the tuning system 17 implements a process 30 (FIG. 2) that executes two threads when a user selects a channel. The process in FIG. 2 can be implemented in a television, in a set-top box, smart card, etc.

A first process thread (i.e., Thread 1) involves looking up cache for cached CA information for a user selected CA scrambled channel to descramble the selected channel. In case of a hit, then the cached CA information is retrieved from the cache. In another example, the system notes which CA scrambled channels have been previously tuned to, and only looks up those channels in the cache (for channels which have not been previously tuned to, the CA information is retrieved from the incoming bit stream).

A second process thread (i.e., Thread 2) involves performing said six steps to retrieve the CA information in the incoming bit stream from the distribution network. Thread 1 ends much earlier than Thread 2, allowing the CA information from the cache to be used to descramble content of the selected channel for user viewing. If the CA information retrieved from the cache is valid, then Thread 2 is terminated once newly retrieved CA information is the same as the cached one.

If the CA information retrieved from the cache is invalid (such that said content cannot be descrambled), the user cannot view descrambled content until Thread 2 completes retrieving CA information for the selected channel from the incoming bit stream (steps 3-7), and provides the retrieved CA information to the CA control module 12 for descrambling the selected channel content. CA information caching and parallel processing guarantees a user the ability to watch the descrambled content at substantially reduced delay for second and subsequent visits to a channel relative to conventional approaches, and in a worst case (e.g., first visit to a channel to requiring updated CA information) almost the same delay as conventional approaches.

The tuning process may further involve, in case of a cache miss, simultaneously retrieving CA information associated with the selected channel from a distribution network (while looking up in cache). The tuning process may further involve, in case of a cache miss, storing the retrieved CA information associated with the selected channel in the cache.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements. Though the present invention has been described with reference to certain versions thereof; however, other versions are possible. Therefore, the spirit and scope of the appended claims should not be limited to the description of the preferred versions contained herein.

What is claimed is:

1. A method of tuning to a scrambled television channel, comprising:
   receiving a channel selection from a user;
   tuning to the selected scrambled channel;
   initiating a thread 1 and a thread 2 in parallel upon tuning to the selected scrambled channel;
   executing thread 1 which includes checking a cache for Conditional Access (CA) information including CA descrambling information associated with the selected channel;
   executing thread 2 which includes retrieving descrambling information associated with the selected channel from a distribution network;
   if there is a cache hit, determining if the CA descrambling information is valid;
   if the CA descrambling information is valid, terminating thread 2, wherein the CA descrambling information is valid if the information is able to descramble the selected channel;
   allowing thread 2 to continue execution through completion if the CA descrambling information in the cache is not valid, such that CA descrambling information is then obtained from the distribution network, and wherein thread 2 is complete once the CA descrambling information is obtained from the network and provided to a CA control module for descrambling the selected channel.

2. The method of claim 1 further comprising:
   in case of a cache miss, retrieving descrambling information associated with the selected channel from distribution network.

3. The method of claim 2 further comprising:
   in case of a cache miss, storing the retrieved descrambling information associated with the selected channel in the cache.

4. The method of claim 1, further comprising:
   in case of a cache hit, overriding the cached descrambling information associated with the selected channel if different from the descrambling information retrieved from the distribution channel.

5. The method of claim 1 further comprising: applying the descrambling information to the selected scrambled channel to descramble scrambled channel content to presentation to the user.

6. The method of claim 1, wherein the scrambled television channel comprises Conditional Access (CA) scrambled channel.

7. The method of claim 6, wherein the selected channel includes conditional access scrambled MPEG content.

8. An apparatus for tuning to a scrambled television channel, comprising:
   a cache configured for maintaining descrambling information associated with one or more scrambled channels; and
   a tuning system configured for tuning to a selected scrambled channel and for initiating a thread 1 and a thread 2 in parallel upon said tuning to the selected channel wherein thread 1 includes checking the cache for Conditional Access (CA) information including CA descrambling information associated with the selected channel, and wherein thread 2 includes retrieving descrambling information associated with the selected channel from a distributed network, wherein if there is a cache hit, determining if the CA descrambling information is valid, and wherein if the CA descrambling information is valid, terminating thread 2, wherein the CA descrambling information is valid if the information is able to descramble the selected channel, said tuning system further configured for allowing thread 2 to continue execution through completion if the CA descrambling information in the cache is not valid, such that CA descrambling information is then obtained from the distribution network, and wherein thread 2 is complete once the CA descrambling information is obtained from the network and provided to a CA control module for descrambling the selected channel.

9. The apparatus of claim 8, wherein the tuning system is further configured for:
   in case of a cache miss, retrieving descrambling information associated with the selected channel from a distribution network.

10. The apparatus of claim 9, wherein the tuning system is further configured for:
    in case of a cache miss, storing the retrieved descrambling information associated with the selected channel in the cache.

11. The apparatus of claim 8, wherein the tuning system is further configured for:
    in case of a cache hit, overriding the cached descrambling information associated with the selected channel if different from the descrambling information retrieved from the distribution channel.

12. The apparatus of claim 8, wherein the scrambled television channel comprises Conditional Access (CA) scrambled channel.

13. The apparatus of claim 12, wherein the selected channel includes conditional access scrambled MPEG content.

14. A system for tuning to a scrambled television channel, comprising:
    a tuner configured for receiving a channel selection and tuning to a scrambled television channel;
    a tuning apparatus comprising:
    a cache configured for maintaining Conditional Access (CA) information including CA descrambling information associated with one or more scrambled channels;
    a tuning module configured for tuning to a selected scrambled channel and for initiating a thread 1 and a thread 2 by wherein thread 1 includes checking cache for CA descrambling information associated with the selected channel, and wherein thread 2 includes retrieving descrambling information associated with the selected channel from a distributed network, wherein if there is a cache hit, determining if the CA descrambling information is valid, and wherein if the CA descrambling information is valid, terminating thread 2, wherein the CA descrambling information is valid if the information is able to descramble the selected channel, said tuning system further configured for allowing thread 2 to continue execution through completion if the CA descrambling information in the cache is not valid, such that CA descrambling information is then obtained from the distribution network, and wherein thread 2 is complete once the CA descrambling information is obtained from the network and provided to a CA control module for descrambling the selected channel; and
    a descrambler configured for applying the descrambling information to the selected scrambled channel to descramble scrambled channel content for presentation to the user on a display screen.

15. The system of claim 14, wherein the tuning module is further configured for:
    in case of a cache miss, retrieving descrambling information associated with the selected channel from a distribution network.

16. The system of claim 15, wherein the tuning module is further configured for:
    in case of a cache miss, storing the retrieved descrambling information associated with the selected channel in the cache.

17. The system of claim 14, wherein the tuning module is further configured for:
    in case of a cache hit, also retrieving descrambling information associated with the selected channel from a distribution network, and overriding the cached descrambling information associated with the selected channel if different from the descrambling information retrieved from the distribution channel.

18. The system of claim 14, wherein the scrambled television channel comprises Conditional Access (CA) scrambled channel.

19. The system of claim 18, wherein the selected channel includes conditional access scrambled MPEG content.

\* \* \* \* \*